United States Patent [19]

Dittrich

[11] Patent Number: 4,603,982
[45] Date of Patent: Aug. 5, 1986

[54] MOLDED BEARING

[75] Inventor: Patrick E. Dittrich, South Bend, Ind.

[73] Assignee: Auscilla Plastics, Inc., South Bend, Ind.

[21] Appl. No.: 704,006

[22] Filed: Feb. 21, 1985

[51] Int. Cl.⁴ .................. F16C 17/00; F16C 33/20; F16C 13/00

[52] U.S. Cl. .................................. 384/129; 384/297; 384/300; 384/416

[58] Field of Search ............. 384/125, 129, 91, 297, 384/296, 299, 300, 416, 417

[56] References Cited

U.S. PATENT DOCUMENTS

| | | | |
|---|---|---|---|
| 536,048 | 3/1895 | Schofield | 384/296 |
| 3,022,127 | 2/1962 | Vollmer | 384/129 |
| 3,378,316 | 4/1968 | Hotine | 384/125 |
| 3,920,293 | 11/1975 | Takeuchi | 384/129 X |
| 4,193,310 | 3/1980 | Boyer et al. | 384/417 X |

FOREIGN PATENT DOCUMENTS 1187956  4/1970  United Kingdom ............... 384/299

Primary Examiner—Stuart S. Levy
Assistant Examiner—Thomas R. Hannon
Attorney, Agent, or Firm—James D. Hall

[57] ABSTRACT

A bearing having an outer race defining an internal channel and an inner race having integrally formed protrusions which extend into the outer race channel for load bearing support.

5 Claims, 6 Drawing Figures

MOLDED BEARING

SUMMARY OF THE INVENTION

This invention relates to a bearing and will have specific application to a molded bearing.

The bearing of this invention includes an outer race and an inner race having integrally molded spheroids which act as the bearing surface. The bearing is highly effective in supporting light loads with no lubricants and can be manufactured at a low cost.

Accordingly, it is an object of this invention to provide for a molded plastic radial or thrust bearing having inner and outer races.

Another object of this invention is to provide for a light duty bearing which requires no lubricants.

Another object of this invention is to provide for a light duty bearing which is efficient and economical.

Other objects of this invention will become apparent upon a reading of the following description.

DESCRIPTION OF THE PREFERRED EMBODIMENTS

The preferred embodiments herein described are not intended to be exhaustive or to limit the invention to the precise forms disclosed. They are chosen and described to explain the principles of the invention and their application and practical use to enable others skilled in the art to utilize the invention.

Figure 1:
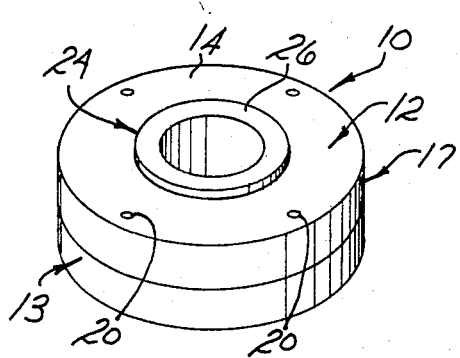
FIG. 1 is a perspective view of the bearing.
Figure 2:
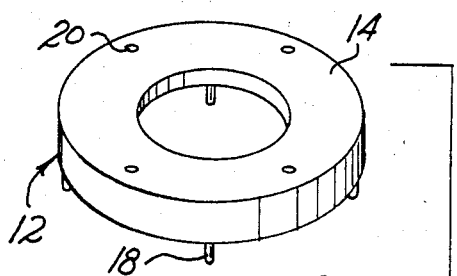
FIG. 2 is an exploded view of the bearing showing its component parts.
Figure 2:
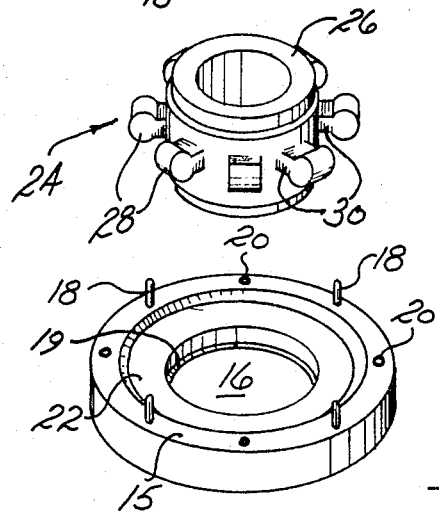
Figure 3:
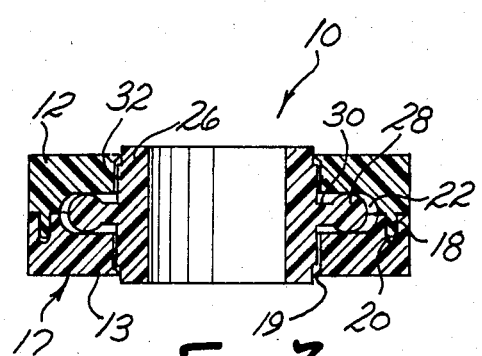
FIG. 3 is a longitudinal sectional view of the bearing of FIG. 1.

The bearing 10 shown in FIGS. 1-3 includes a pair of symmetrical outer race parts 12,13. Each other race part 12,13 includes an annular body 14 having a centrally positioned opening 16. Each body 14 is preferably formed of molded plastic material, such as nylon. Race part 12 includes a plurality of circumferentially spaced pins 18 and race part 13 includes a plurality of circumferentially spaced bores 20 which are located upon the inner face 15 of the race body 14. Each body 14 also includes a circular channel 22 formed in its inner face 15 concentrically about opening 16, as shown in FIG. 2. Each body 14 includes an annular sealing flange 19 formed about the outer periphery of opening 16.

Figure 4:
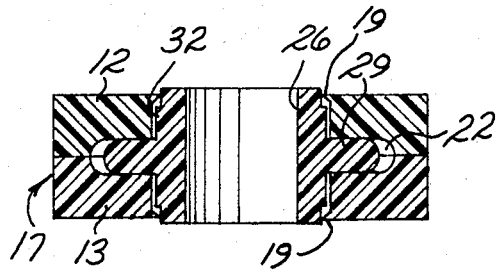
FIG. 4 is a sectional view of the bearing showing an alternative configuration.

Bearing 10 includes an inner race 24 which is a cylindrical shaped sleeve 26 and is formed of low friction material such as Delrin AF (polyacetyl resin containing 22% teflon fibers). Integrally molded to the body of sleeve 26 are a plurality of equal radially spaced protrusions 28. As shown in FIGS. 2-3, protrusions 28 are spherically shaped and are connected to the sleeve body by a web 30. Alternatively, protrusions 29 may be of the semi-spherical configuration shown in FIG. 4.

Bearing 10 is assembled and functions as follows. Sleeve 26 is positioned within a central opening 16 of one of the outer race parts 12 with protrusions 28 or 29 extending into channel 22 of the race part. The other outer race part 13 is then positioned over race part 12 and sleeve 26 with pins 18 fitting into bores 20 to enclose the sleeve. Race parts 12 and 13 when joined form the outer race 17 of bearing 10. The outer race parts 12 and 13 may be secured together by the interference fit of pins 18 within bores 20 or by a bonding material. Inner race 24 is freely rotatable within outer race 17 with protrusions 28 or 30 in conjunction with shoulder 32 of sleeve 26 acting as load bearing components.

Figure 5:
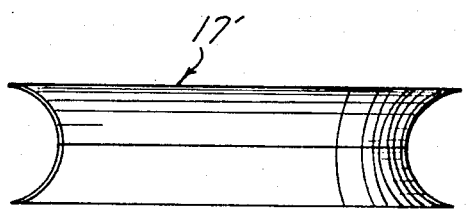
FIG. 5 is a side view showing an alternative outer race configuration.
Figure 6:
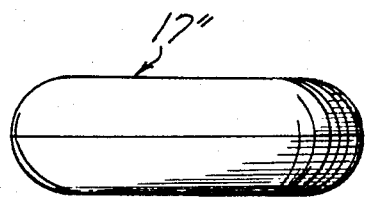
FIG. 6 is a side view showing another alternative outer race configuration.

Alternatively, bearing outer race parts 12,13 may be formed of various configurations. As depicted in FIG. 5, outer race 17' is of concave configuration at its outer periphery, while FIG. 6 shows an outer race 17" of convex outer configuration. Outer races 17' and 17" allow bearing 10 to be accommodated in different shaped mounting blocks and are adapted to house an inner race 24 as described above.

It is to be understood that the above description does not limit the invention, but may be modified within the scope of the appended claims.

I claim:

1. A bearing comprising an outer race which includes first and second symmetrical race parts, an interior channel formed with said outer race, and an inner sleeve member positioned within said outer race and including a plurality of protrusions extending radially from said inner sleeve into said interior channel of the outer race, each protrusion being generally spherical in shape and including a web extending from each protrusion to said sleeve, each web being of lesser dimension than the diameter of each protusion wherein said protrusions are filled freely within said outer race interior channel, said protrusions constituting load bearing means for allowing free rotation of said sleeve member within said outer race.

2. The bearing of claim 1 wherein said protrusions are at least semi-spherical in configuration.

3. The bearing of claim 1 wherein said protrusions are equally radially spaced about said sleeve.

4. The bearing of claim 1 wherein said sleeve member includes a peripheral shoulder means for supporting a load placed upon said bearing.

5. The bearing of claim 1 wherein said first symmetrical race part includes a plurality of pins, said second symmetrical race part including a plurality of bores complemental with said pins, said pins and bores constituting means for fastening said outer race first and second symmetrical parts about said protrusions.

* * * * *